(12) United States Patent
Kato et al.

(10) Patent No.: US 7,298,559 B2
(45) Date of Patent: Nov. 20, 2007

(54) VARIABLE FOCUS LENS AND OPTICAL DEVICE USING THE SAME AS WELL AS METHOD OF MANUFACTURING VARIABLE FOCUS LENS

(75) Inventors: Yoshiaki Kato, Gunma (JP); Fumisada Maeda, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/393,862

(22) Filed: Mar. 31, 2006

(65) Prior Publication Data
US 2006/0221458 A1   Oct. 5, 2006

(30) Foreign Application Priority Data
Apr. 1, 2005   (JP) ............................. 2005-106524

(51) Int. Cl.
*G02B 1/06* (2006.01)
*G02B 3/12* (2006.01)

(52) U.S. Cl. ........................ 359/666; 359/665
(58) Field of Classification Search ........ 359/665–666, 359/642, 676
See application file for complete search history.

(56) References Cited

U.S. PATENT DOCUMENTS

| 5,932,860 | A  | * | 8/1999  | Plesko ........................ 235/454 |
| 6,569,717 | B1 | * | 5/2003  | Murade ...................... 438/149 |
| 6,603,444 | B1 | * | 8/2003  | Kawanami et al. ......... 345/32 |
| 6,859,333 | B1 | * | 2/2005  | Ren et al. .................... 359/721 |
| 2001/0038499 | A1 | * | 11/2001 | Baartman et al. ........... 359/821 |
| 2003/0012483 | A1 |   | 1/2003  | Ticknor et al. |
| 2005/0041301 | A1 | * | 2/2005  | Kibayashi ................... 359/666 |
| 2006/0215273 | A1 | * | 9/2006  | Kuiper et al. ............... 359/666 |
| 2006/0215274 | A1 | * | 9/2006  | Renders et al. ............. 359/666 |

FOREIGN PATENT DOCUMENTS

JP   2001-519539   10/2001
WO  WO 2004/051323 A1   6/2004

OTHER PUBLICATIONS

Kuiper, S. and B. H. W. Hendriks. "Variable-focus liquid lens for miniature cameras." Applied Physics Letters, vol. 85, No. 7 (Aug. 16, 2004), pp. 1128-1130.*
European Search Report, Application No. 06112074.7-2217, dated Aug. 30, 2006.
Kuiper, et al., "Variable-focus Liquid Lens for Miniature Cameras", Applied Physics Letters, vol. 85, No. 7, Aug. 16, 2004, pp. 1129-1130.

* cited by examiner

*Primary Examiner*—Jordan M. Schwartz
(74) *Attorney, Agent, or Firm*—Rader Fishman & Grauer PLLC; Ronald P. Kananen

(57) ABSTRACT

A variable focus lens contains a conductive liquid material portion and an insulative liquid material portion in a cylindrical container and includes a first electrode which applies voltage to the conductive liquid material portion through a dielectric layer and a second electrode which directly contacts with the conductive liquid material portion, in which the dielectric layer is an anodized portion 22 made of a metal oxide formed by anodizing the first electrode.

23 Claims, 5 Drawing Sheets

VARIABLE FOCUS LENS AND OPTICAL DEVICE USING THE SAME AS WELL AS METHOD OF MANUFACTURING VARIABLE FOCUS LENS

CROSS REFERENCES TO RELATED APPLICATIONS

The present invention contains subject matter related to Japanese Patent Application JP 2005-106524 filed in the Japanese Patent Office on Apr. 1, 2005, the entire contents of which are incorporated herein by reference.

BACKGROUND OF THE INVENTION

1. Field of the Invention

The present invention relates to a variable focus lens and an optical device using this lens, and to a method of manufacturing a variable focus lens, by using an electrowetting phenomenon.

2. Description of the Related Art

Development of a variable focus lens device that uses the electrowetting phenomenon is disclosed in a Patent Document of Japanese Translation of PCT International Application No. 2001-519539 (hereinafter referred to as Document 1, corresponding to United States Published Patent Application No. US2005/0002113A1), and in another document: S. Kuiper et al., "Variable-focus liquid lens for miniature cameras", Applied Physics Letters, Vol. 85, No. 7, 16 Aug. 2004, pp. 1128-1130 (hereinafter referred to as Document 2).

A variable focus lens described in each of the above-described documents is explained with reference to a schematic sectional constitutional view of FIG. 1.

This variable focus lens has a basic structure in which a container 10 of a cylindrical shape or the like is filled with a light-transmissible, conductive liquid material portion 1 and a light-transmissible, insulative liquid material portion 2 that does not mix with the above and that has a different refractive index and the same density (specific gravity). A first electrode 21 is formed to the outside from an internal wall of the container, covering one end portion thereof, and a dielectric film 32 is formed inside thereof. The end portion of the container 10 on the side covered by the first electrode 21 is fixed liquid tightly (a hermetically-sealed state not to leak liquid) with a light-transmissible material portion 11 made of glass, light-transmissible resin or the like, and a so-called bottom surface formed by this light-transmissible material portion 11 and the dielectric film 32 on the internal wall of the container 10 are covered and coated with a water-repellent material portion 23 called a water-repellent coat.

Then, on one end portion of the container 10 in contact with the conductive liquid material portion 1, namely on a lid-side portion, for example, a ring-shaped second electrode 24 is provided, and a light-transmissible material portion 12 made of glass, light-transmissible resin or the like is fixed liquid tightly (a hermetically-sealed state not to leak liquid) through a hydrophilic material portion 25 called hydrophilic coat. The edge portion of the ring-shaped second electrode 24 described above is extended and formed to cover the outer circumferential surface of this light-transmissible material portion 12.

Further, regarding the first electrode 21, an end portion on the internal surface side of the container 10 is separated from one end portion of the container 10, namely one end portion on the side where the second electrode 24 is arranged.

With the above structure, on applying a suitable voltage to the first electrode 21 and the second electrode 24 by voltage applying means 40a, the curvature of an interface between the conductive liquid material portion 1 and the insulative liquid material portion 2 is changed. By means of this, the lens action for light entered as shown with an arrow Li from the outside of the light-transmissible material portion 11 is changed, and a focal distance can be changed.

Figure 1:
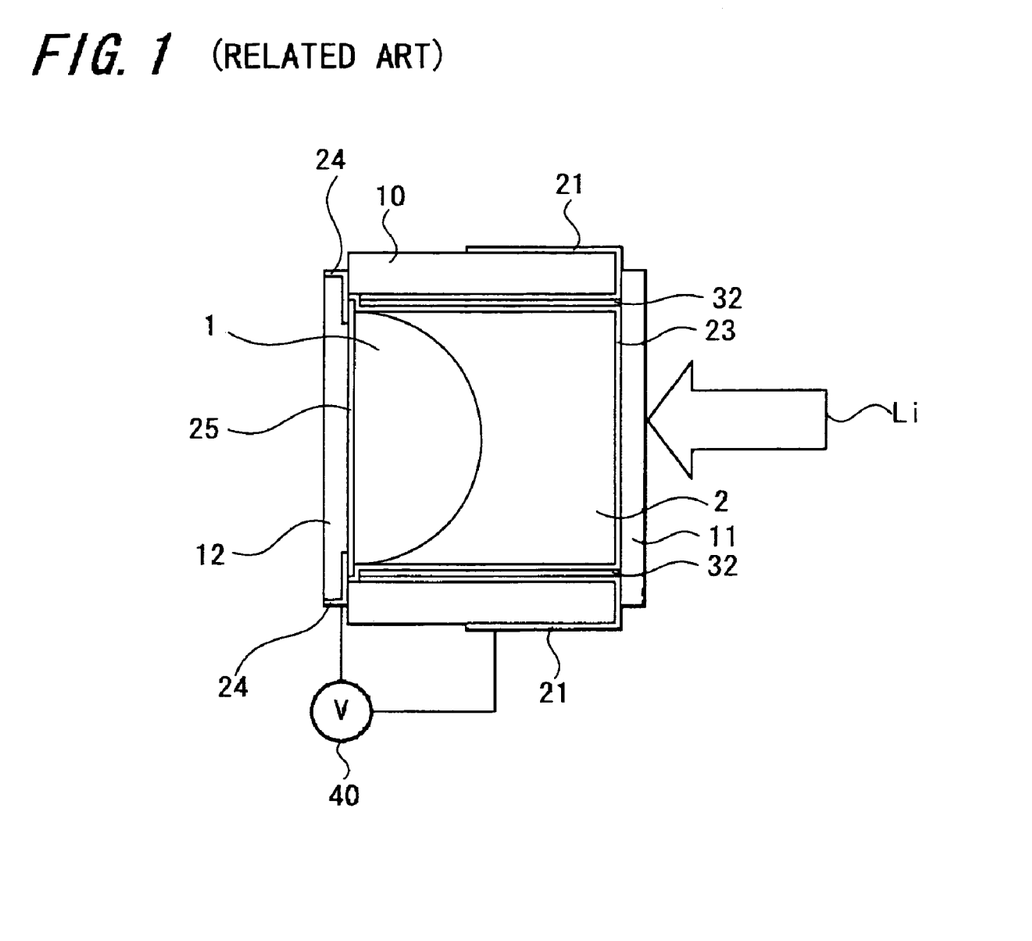
FIG. 1 is a schematic sectional constitutional view showing an example of a variable focus lens of related art.

Explanation will be given about this, at first, when voltage is not applied to the first and second electrodes 21 and 24, an interface between the conductive liquid material portion 1 and insulative liquid material portion 2 becomes a part of a spherical surface of a certain radius, as shown in FIG. 1, by the balance of the surface tensions of the liquid material portions 1 and 2 filled and the internal surface of the container 10. For example, when salt water is used as the conductive liquid material portion 1 and silicon oil is used as the insulative liquid material portion 2, the interface becomes such that the water (conductive liquid material portion 1) has a convex shape, as shown in FIG. 1.

Then, when voltage is applied between the first and second electrodes 21 and 24, as if "wettability" of the conductive liquid material portion 1 were improved (this phenomenon is called electrowetting) on the internal wall surface of the container 10, and interface between the respective liquid material portions 1 and 2 changes such that a curvature radius of the interface becomes large, as shown in FIG. 2, for example.

Then, when light enters as shown with an arrow Li from a lid on one side of the container 10, namely from the light-transmissible material portion 11 and the light is emitted from the other lid, namely from the light-transmissible material portion 12, with a lens effect being caused by the difference in the refractive index and the curvature of interface between the liquids 1 and 2, and with the curvature of interface of the liquids being changed because of the electrowetting when voltage is applied, the focal distance is changed.

Figure 2A:
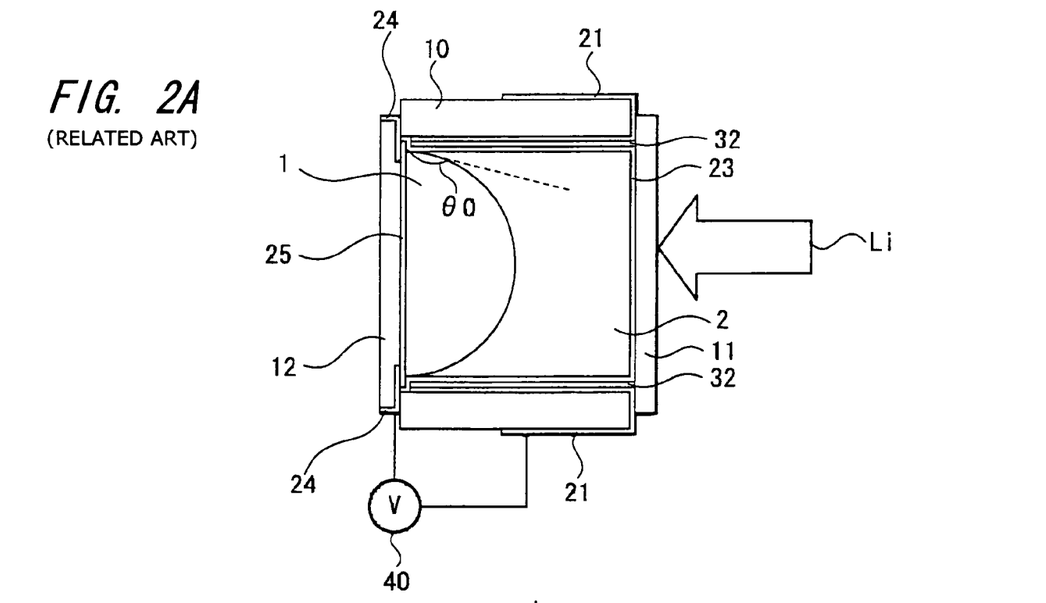
FIGS. 2A and 2B are schematic sectional constitutional views, each of which shows an example of a variable focus lens of related art.
Figure 2B:
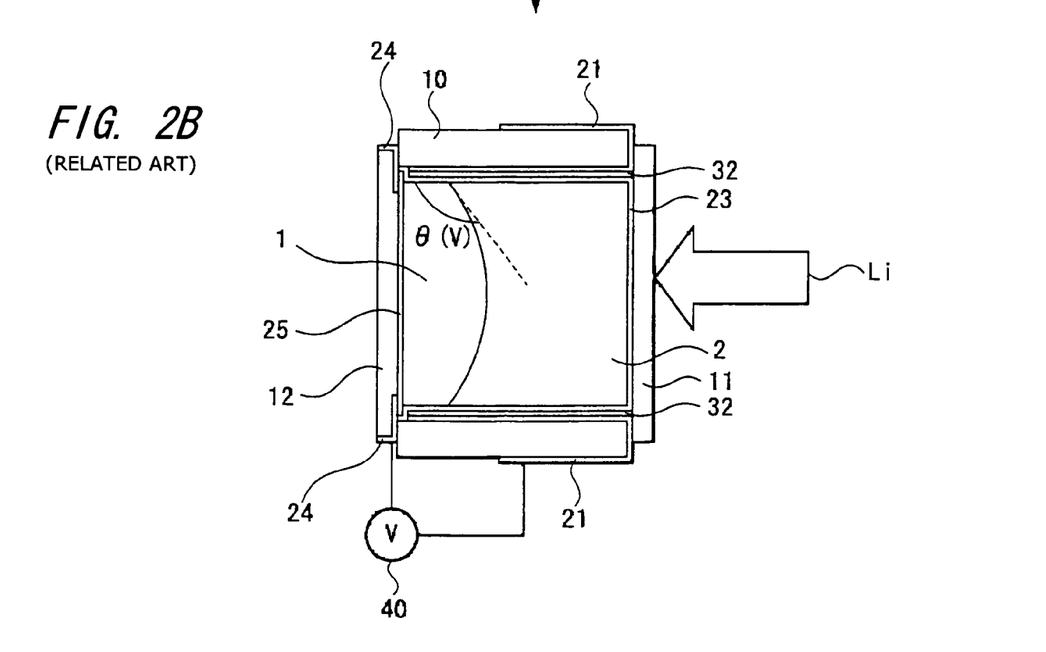

For example, as shown in FIG. 2A, a contact angle between the conductive material portion 1 and the dielectric film 32 is θ0 when voltage is not applied; on the other hand, as shown in FIG. 2B, when voltage V is applied, the contact angle θ(V) becomes small, and the curvature of the interface between both the liquids changes. In FIGS. 2A and 2B, the same numerals are given to the portions corresponding to those in FIG. 1 and the repetitive explanation thereof is omitted.

SUMMARY OF THE INVENTION

In a variable focus lens disclosed in each of the above-described documents, drive voltage needs to be approximately 100V or more, and so it is practically difficult to use. This is caused by difficulty in forming a dielectric film to be uniformly thin in the container that contains liquid constituting the variable focus lens. Hereinafter, an explanation will be given regarding the above.

The change in the interface of the conductive liquid and the insulative liquid is shown with the following Equation (1) (refer to the above-described Document 2):

$$\cos \theta = (\gamma_{SO} - \gamma_{SL})/\gamma + \in \cdot \in 0 \cdot V^2/(2 \cdot l\gamma) \qquad (1)$$

where

θ is the contact angle formed by a conductive liquid material and an internal wall of a container;

$\gamma_{SO}$ is the interfacial tension between an insulative liquid material and the internal wall of the container;

$γ_{SL}$ is the interfacial tension between the conductive liquid material and the internal wall of the container;

$γ$ is the interfacial tension between the conductive liquid material and the insulative liquid material;

∈ relative permittivity of a dielectric film formed on the internal wall of the container;

∈0 permittivity in a vacuum;

l film thickness of a dielectric film; and

Figure 3:
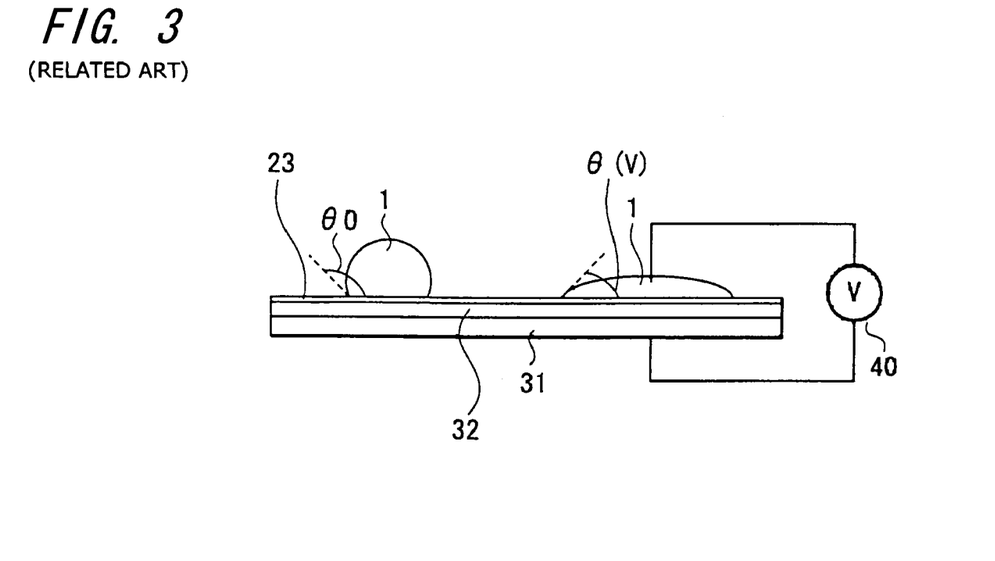
FIG. 3 is a schematic explanatory view showing the change of a contact angle of a variable focus lens of related art.

V applied voltage;

The Equation (1) is explained with reference to a schematic view of FIG. 3, in which a dielectric film 32 and a water-repellent material portion 23 are formed on an electrode 31, a liquid drop of the conductive liquid material portion 1 is placed thereon, and the contact angle is θ0. When a voltage V is applied between the electrode 31 and the conductive liquid material portion 1 by a voltage applying portion 40, the contact angle of the conductive liquid material 1 changes to θ(V), satisfying θ(V)<θ0.

Figure 4:
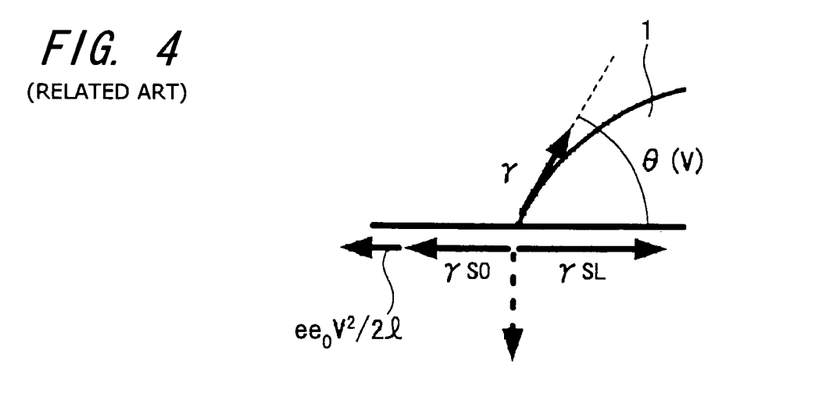
FIG. 4 is an explanatory view showing a contact angle of a variable focus lens of related art.

The interfacial tension and the surface tension when voltage is applied are schematically shown in FIG. 4.

Specifically, with the Equation (1), the change of a contact angle θ formed by the conductive liquid material and the internal wall of the container occurs in proportion to the permittivity ∈ of a dielectric film and the square of drive voltage V and in inverse proportion to a film thickness l of the dielectric film. Therefore, it is understood that if the permittivity ∈ of the dielectric film can be made high and the film thickness l can be made thin, drive voltage that causes the same change of the focal distance can be reduced.

However, when in actuality the dielectric film is formed, it is difficult to form a high dielectric film of uniform submicron (less than one μm) thickness having a high dielectric breakdown strength on the internal wall of the container of cylindrical shape or the like without generating pinholes.

The reason why the drive voltage to cause a focal change is high in a variable focus lens of the related art is that the permittivity of the dielectric film is as low as approximately 3 and the thickness of the dielectric film is thick (several μm), which also shows the result of having difficulty in forming a dielectric thin film due to the above-described reasons.

Therefore, it is desirable to provide a variable focus lens and an optical device including the same in which the drive voltage of the variable focus lens is reduced and to provide a comparatively simplified method of manufacturing the variable focus lens.

A variable focus lens according to an embodiment of the present invention includes: a container where a conductive liquid material portion and an insulative liquid material portion are contained; a first electrode which applies voltage to the conductive liquid material portion through a dielectric layer; and a second electrode which directly contacts with the conductive liquid material portion, in which the dielectric layer is an anodized portion made of a metal oxide formed by anodizing the first electrode.

Further, an optical device according to an embodiment of the present invention includes as a variable focus lens the variable focus lens according to the above-described embodiment of the present invention.

Further, a method of manufacturing a variable focus lens according to an embodiment of the present invention at least includes the steps of: forming a first electrode to a container and anodizing at least the surface thereof to form an anodized portion; containing a conductive liquid material portion and an insulative liquid material portion in the container; and forming a second electrode that electrically conducts to the conductive liquid material portion.

As described above, in the variable focus lens and the method of manufacturing thereof according to embodiments of the present invention, a metal oxide formed by anodizing an electrode is used as a dielectric film in a variable focus lens that was used in related art. Regarding the anodized portion made of a metal oxide, the film thickness thereof can be adjusted easily and accurately by adjusting the voltage to be applied.

Specifically, various materials with which oxides of comparatively high permittivity, such as an alumina, tantalum pentoxide film and the like formed by anodizing metals of aluminum, tantalum and the like are obtained can be used. As described above, by using an anodized portion which is highly insulated and has a high permittivity and whose film thickness is easily reduced as a dielectric film, considerably low voltage drive can be obtained.

DESCRIPTION OF THE PREFERRED EMBODIMENTS

Hereinafter, embodiments for carrying out the invention are explained; however, the present invention is not limited to the following embodiments.

An embodiment of a variable focus lens according to the present invention is explained with reference to a schematic sectional constitutional view of FIG. 5.

This variable focus lens has almost the same structure as the above-explained variable focus lens of related art in FIG. 1, and includes, instead of the dielectric film 32, an anodized portion 22 made of a metal oxide formed by anodizing the surface of a first electrode 21. In FIG. 5, the portions corresponding to those in FIG. 1 are given the same numerals.

Also, in this embodiment, the first electrode 21 is formed to the outside from the internal wall of a container 10 made of an insulative material of cylindrical shape or the like, covering one end portion thereof. In the present invention, for example, the surface on the internal wall side of the container 10 is anodized so as to be the anodized portion 22 having a predetermined permittivity.

The end portion of the container 10 on the side covered by the first electrode 21 is fixed by means of, for example, epoxy resin and the like liquidtightly (a hermetically-sealed state not to leak liquid) with a circular light-transmissible material portion 11 made of glass, light-transmissible resin or the like, and a so-called bottom surface formed by this light-transmissible material portion 11 and the dielectric film 32 on the internal wall of the container 10 are covered and coated with a water-repellent material portion 23 called a water-repellent coat.

The conductive liquid material portion 1 and insulative liquid material portion 2 are contained in the order of the insulative liquid material portion 2 and the conductive liquid material portion 1 from the light-transmissible material portion side 11 constituting the bottom.

Then, on the other end of the container 10 in contact with the conductive liquid material portion 1 a ring-shaped second electrode 24, is provided for example, and a light-transmissible material portion 12 made of glass, light-transmissible resin or the like is fixed liquidtightly (a hermetically-sealed state not to leak liquid) through a hydrophilic material portion 25 called a hydrophilic coat. Also, in this embodiment, the edge portion of the ring-shaped second electrode 24 is extended and formed to cover the outer circumferential surface of this light-transmissible material portion 12. In the case where the second electrode 24 is made of a light-transmissible material, the electrode may be circular instead of being ring-shaped.

Note that, in the case where the light-transmissible material portion 12 is made of glass and the internal surface thereof is cleaned to maintain hydrophilicity, the hydrophilic material portion 25 may not be needed.

Further, also in this case, the first electrode 21 has a structure in which the end portion on the internal surface side of the container 10 is provided separately from the end portion of the container 10 where the second electrode 24 is arranged. Further, the first electrode 21 on the outside of the container 10 and the second electrode 24 on the outer circumferential surface of the light-transmissible material portion 12 are connected to a voltage applying portion 40 which applies voltage thereto.

Then, in the variable focus lens according to an embodiment of the present invention, aluminum or tantalum, for example, is used as the first electrode 21, which is anodized to form the anodized portion 22 made of alumina ($Al_2O_3$) film, tantalum pentoxide ($Ta_2O_5$) film or the like, constituting a dielectric film in a variable focus lens of related art. Accordingly, a high insulation can be obtained with a high permittivity and a considerably thin coating.

As a material of the first electrode 21, other than the above, various metals such as niobium, hafnium and titanium capable of being anodized to form a metal oxide of high permittivity may be used.

An embodiment of a method of manufacturing a variable focus lens of the present invention is explained, in the case where tantalum is used as an electrode material and is anodized to form the anodized portion 22 made of tantalum pentoxide.

First, from the internal wall of the container 10 of cylindrical shape or the like, covering one end portion toward a part of the outside of the container 10 which becomes an area where an electrode is taken out, a tantalum thin film is formed by sputtering or the like with a sufficient thickness capable of avoiding the occurrence of pinholes. Alternatively, the container 10 may be made of tantalum or other metals.

Next, only the internal wall of the container 10 is soaked in the electrolyte of phosphoric acid or the like and is anodized.

Then, after that, the light-transmissible material portion 11 is fixed liquid tightly (a hermetically-sealed state not to leak liquid) to one end of the container 10 on the side covered by the first electrode 21, the internal surface is coated with the water-repellent material portion 23, and the insulative liquid material portion 2 and the conductive liquid material portion 1 are injected inside. Then, after coating the surface with the hydrophilic material portion 25, the light-transmissible material portion 12, to which the second electrode 24 having the above-described shape is deposited by sputtering or the like, is fixed to obtain a variable focus lens having a structure of the present invention.

As in a variable focus lens of related art, in the case where the dielectric film is formed by a vacuum deposition method, namely, sputtering, CVD (Chemical Vapor Deposition), spin-coat or the like, an electrode needs to be provided as a base. Therefore, such a defect as a pinhole may cause a dielectric breakdown. Further, the film needs to be formed with a uniform thickness on the internal wall of the container. However, since the pinhole is easily caused depending on the surface condition of the base, that is, of the electrode, the thickness of the dielectric film needs to be large to prevent that and it is difficult to lower the drive voltage according to the Equation (1).

Further, the larger the thickness of the dielectric film becomes, the more unevenness tends to occur, and so the interface between the conductive liquid material portion 1 and the insulative liquid material portion 2 also does not become a spherical shape according to the above-described Equation (1), a favorable curvature of the lens is not obtained, and the optical quality may deteriorate.

On the other hand, according to the embodiment of the present invention, not the whole metal thin film of tantalum or the like is anodized and a part of which is preserved as metal, and therefore the remaining metal tantalum layer can be used as the first electrode as it is.

In other words, since only the surface of the metal that becomes the electrode is anodized to be the dielectric film, theoretically, a pinhole is not generated and the film has the advantage of being strong against the dielectric breakdown.

Further, having increased in volume in the process of changing into a metal oxide, the anodized portion 22 becomes a dense film at the anodized portion, and the occurrence of the pinhole can be controlled.

Furthermore, if a material of the container to be a base is an insulative material when a metal material of tantalum or the like is formed as a film, dielectric breakdown would not occur even if there is a little pinhole defect in the metal film of tantalum or the like, and the defect does not become a practical. Furthermore, since dielectric breakdown does not occur until the formation voltage in the metal oxide formed by anodization, the anodized portion obtained also has the effectiveness that the dielectric breakdown strength is high.

Note that, the thickness of the film formed by the anodization depends on the formation voltage. For example, in the case where tantalum is used, theoretically, it is approximately 1.8 nm for 1V of the formation voltage. In addition, the film thickness becomes uniform because the film is anodized by liquid immersion. Specifically, even if the film thickness is uneven in the metal film of tantalum or the like formed first, the film thickness of the anodized portion is uniform and therefore the curvature of lens can be maintained favorably to be spherical, and so the variable focus lens made having a favorable optical characteristic can be made.

Furthermore, such a manufacturing method that uses anodization has been used widely for a tantalum capacitor and the like, and because the device structure is comparatively simple and the production technology has already been established, production is considerably easy.

Moreover, regarding a variable focus lens having the structure according to an embodiment of the present invention, a device and a method for manufacture are simplified and mass production can be performed in comparison with the case in which a dielectric film is formed by the vacuum deposition method, the spin-coat method and the like of related art.

In the variable focus lens in the above-described Document 2, the relative permittivity of the dielectric film is approximately 3 and the film thickness is approximately 3 µm.

On the other hand, in the variable focus lens according to an embodiment of the present invention, in the case where metal tantalum was anodized by 100V, for example, the relative permittivity is approximately 27 and the film thickness is approximately 0.18 µm. A component $\in$/l in the second term on the right-hand side of the above Equation (1) becomes about 150 times. Since the drive voltage becomes $1/\sqrt{(\in/l)}$, the drive voltage of the present invention becomes about 1/12 as compared with variable focus lenses described in the above-mentioned Documents 1 and 2.

For example, in a variable focus lens described in the Document 2, in the case where salt water is used as the conductive material portion and silicon oil is used as the insulative material portion, the change of the spherical diopter from −100 D (Diopter) to +50 D is performed by the drive voltage of approximately 120V.

On the other hand, according to an embodiment of the present invention, in the case where materials similar to the above are used for the conductive material portion and the insulative material portion, the change of the spherical diopter of approximately the same range can be performed by a drive voltage of approximately 10V.

Figure 5:
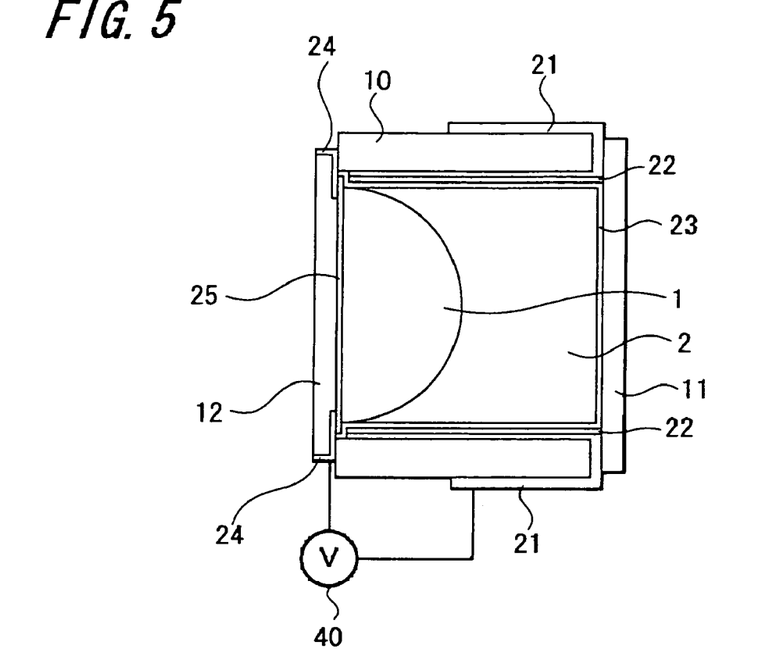
FIG. 5 is a schematic sectional constitutional view showing a variable focus lens according to an embodiment of the present invention.

Specifically, in a variable focus lens of the present invention shown in FIG. 5, on applying a voltage of 10V between the first and second electrodes 21 and 24 by the voltage applying means 40, the spherical diopter can be changed by approximately 150 D in comparison with the state in which voltage is not applied.

Further in this case, since the formation voltage is 100V, there is a sufficient margin for the dielectric breakdown strength.

Moreover, if the film thickness of the anodized portion is made small by adjusting the voltage applied at the time of anodization, drive voltage is further reduced, enabling a drive voltage of approximately 5V, 3V to cause the change of the spherical diopter of the same range.

Figure 6:
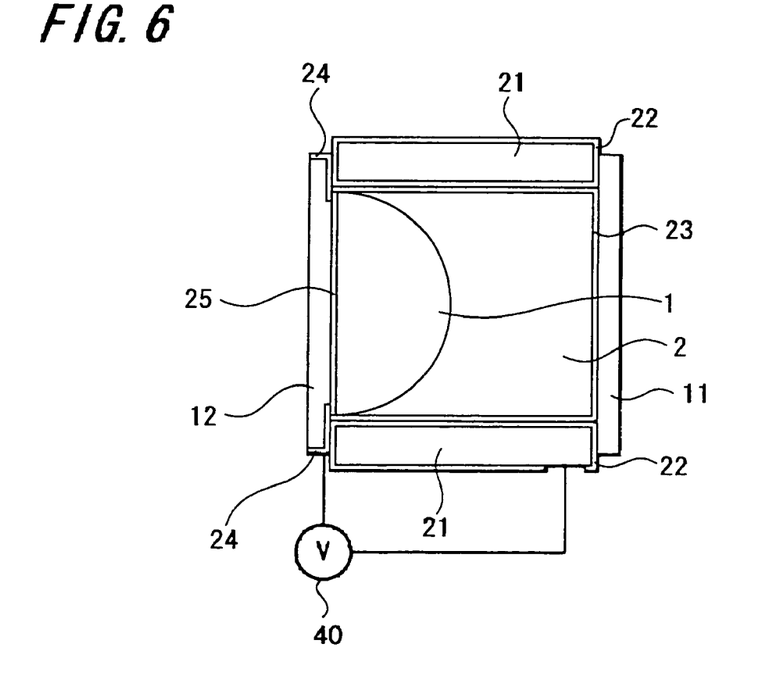
FIG. 6 is a schematic sectional constitutional view showing a variable focus lens according to an embodiment of the present invention.

FIG. 6 shows a variable focus lens in which the container 10 of the variable focus lens shown in FIG. 5 is made of the material of the first electrode 21 to be used both as the first electrode 21 and as the container. A case in which the whole surface of the container 10 that is also the first electrode 21 was anodized to provide the anodized portion 22 is shown. In FIG. 6, the same numerals are given to the portions corresponding to those in FIG. 5, and repetitive explanations thereof are omitted. Note that, at the portion connected to the voltage applying means 40 a part of the anodized portion 22 of the first electrode 21 has been removed. Alternatively, a convex portion is provided on a part of the container 10 and anodization is performed in the state in which this convex portion is not immersed in anodizing solution, and a portion after removing the convex portion may be made to be an area connected to the voltage applying means 40.

In the case of such a structure, the film of the first electrode 21 need not be formed on a part of the surface of the container 10 of cylindrical shape or the like by sputtering and the like, which is advantageous to the production.

Figure 7:
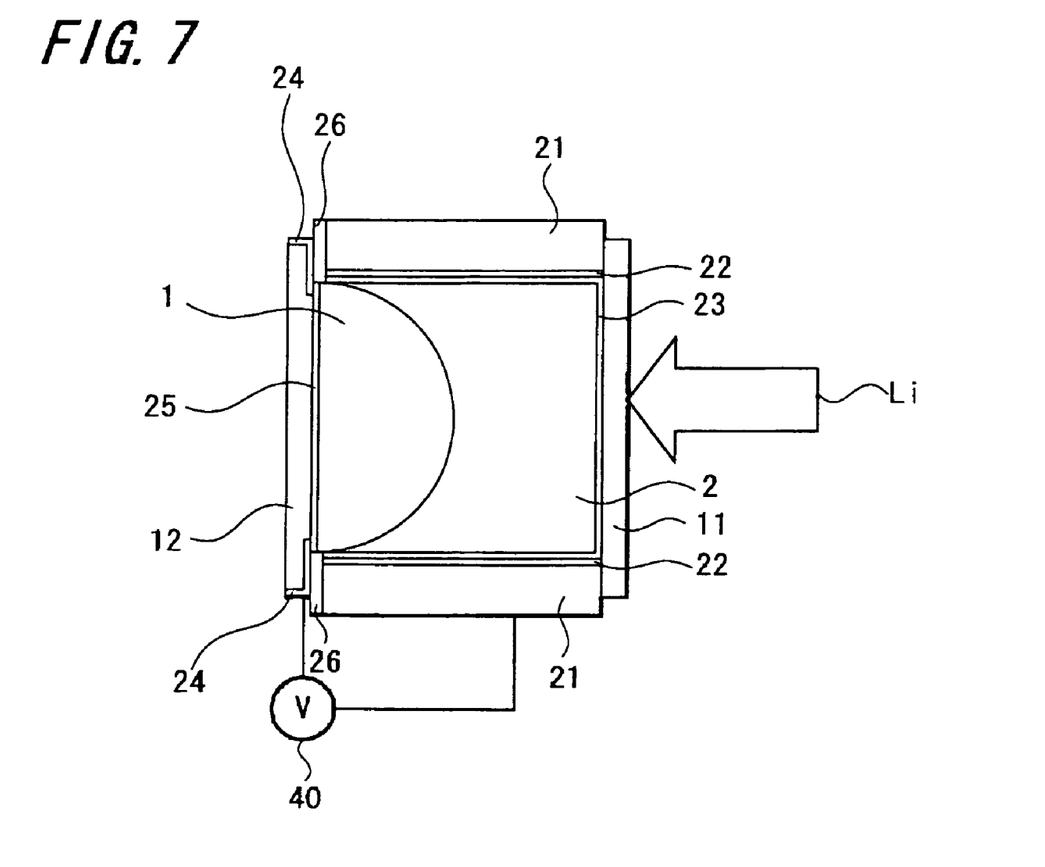
FIG. 7 is a schematic sectional constitutional view showing a variable focus lens according to an embodiment of the present invention.

Similarly to the example shown in FIG. 6, as described above, FIG. 7 shows an example of a structure in which a first electrode 21 also is used as a container and in which a ring-shaped insulative material 26, for example, made of an insulative material is positioned between the surface on the second electrode side of an anodized portion 22 and the second electrode 24, in order to secure the insulation from the second electrode 24. With such a structure, the production process is simplified and a variable focus lens having a favorable characteristic can be made.

In the cases in which those structures are used, similarly to the example shown in FIG. 5 that is described above, the drive voltage can be reduced in comparison with related art, and there is the effectiveness that sufficient dielectric breakdown strength can be obtained.

As explained above, according to the variable focus lens and the method of manufacturing the same according to the embodiment of the present invention, since an anodized portion formed by the anodization is used as a dielectric film, the manufacturing method is simplified and the film thickness can be made thin in comparison with the case in which the film is formed by the vacuum deposition method of related art. Accordingly, since the thickness of the dielectric film can be reduced and a material having higher permittivity can be used without difficulty, drive voltage to obtain a desirable change of the focal distance (change of the spherical diopter) can be reduced greatly in comparison with related art. Further, since the film with the uniform thickness can be formed accurately using a simplified manufacturing method in comparison with related art, deterioration of the optical characteristic caused by the unevenness of the film thickness can be avoided, and further, the occurrence of a pinhole is controlled, or the influence of the pinhole can be avoided in the case where the container is made of an insulative material.

Thus, the variable focus lens with a favorable optical characteristic in which drive voltage is reduced can be provided.

The variable focus lens according to the embodiment of the present invention, in which drive voltage can be reduced greatly in comparison with related art, can be applied to various optical devices that use a small variable focus lens, which was impossible in the past.

For example, the above lens can be used as a small variable focus lens in a mobile phone unit with a camera function, a small camera, a small imaging device and the like.

Further, in optical disc devices which perform recording and/or reproducing of various optical discs represented by a CD (Compact Disc), DVD (Digital Versatile Disc), BD (Blue-ray Disc™) and the like, the above lens can be used as an aberration correcting element and a collimator lens with variable magnification.

Particularly, in an optical recording device which uses a multiple-wavelength light source compatible with those various optical discs, the focal distance of a collimator lens needs to be variable, and as described above, because drive voltage can be reduced greatly in the case in which a variable focus lens according to the embodiment of the present invention is used, the variable focus lens can be commercially available for these optical devices.

Note that, with respect to a variable focus lens, essentially no electric current flows except at the time when discharging, the power consumption is extremely small and there is no mechanical movable portion, and so there are the advantages of having a long life in comparison with a variable focus lens of related art that is moved by a motor, only a small space being required because the motor is unnecessary, and being provided as an autofocus mechanism with a simplified structure in an optical device. However, as described above, in a variable lens of related art, the drive voltage was high and a voltage boosting circuit was needed when applied to the optical device described above or to various other optical devices.

On the contrary, according to the embodiment of the variable focus lens of the present invention, because drive voltage to obtain a desirable change of the spherical diopter can be reduced to approximately 10V or less, application to various optical devices becomes possible without installing a voltage boosting circuit, and a variable focus lens having the various advantages described above can be used with a comparatively simplified circuit configuration.

It should be understood by those skilled in the art that various modifications, combinations, subcombinations and alterations may occur depending on design requirements and other factors insofar as they are within the scope of the appended claims or the equivalents thereof.

What is claimed is:

1. A variable focus lens comprising:
   a container in which a conductive liquid material portion and an insulative liquid material portion are contained;
   a first electrode which applies voltage to said conductive liquid material portion through a dielectric layer; and
   a second electrode which directly contacts with said conductive liquid material portion,
   wherein said dielectric layer is an anodized portion made of a metal oxide formed by anodizing at least a part of said first electrode and is formed at an internal wall of the container.

2. The variable focus lens according to claim 1,
   wherein said container is made of an insulative material,
   said first electrode is formed to the outside from the internal wall of said container, covering one end portion thereof, and
   said anodized portion is formed on the surface on the internal wall side of said container.

3. The variable focus lens according to claim 1,
   wherein said container is made of metal, and
   a part of said container is made to be the first electrode and at least a part thereof is anodized to be said anodized portion.

4. The variable focus lens according to claim 1,
   wherein said container has cylindrical shape, and includes light-transmissible material portions arranged on both end portions thereof.

5. The variable focus lens according to claim 4,
   wherein said insulative liquid material is arranged facing one of said light-transmissible material portions with a water-repellent material portion in between.

6. The variable focus lens according to claim 5,
   wherein said conductive liquid material is arranged facing the other of said light-transmissible material portions with a hydrophilic material portion in between.

7. The variable focus lens according to claim 4,
   wherein said second electrode is a ring-shaped electrode arranged on the end portion of said container in contact with said conductive liquid material.

8. The variable focus lens according to claim 1,
   wherein said first electrode is formed by using metal selected from tantalum, aluminum, niobium, hafnium and titanium.

9. An optical device comprising:
   a variable focus lens which includes:
   a container in which a conductive liquid material portion and an insulative liquid material portion are contained;
   a first electrode which applies voltage to said conductive liquid material portion through a dielectric layer; and
   a second electrode which directly contacts with said conductive liquid material portion,
   wherein in said variable focus lens, the dielectric layer is an anodized portion made of a metal oxide formed by anodizing at least a part of said first electrode and is formed at an internal wall of the container.

10. The optical device according to claim 9,
    wherein said container is made of an insulative material,
    said first electrode is formed to the outside from the internal wall of said container, covering one end portion thereof, and
    said anodized portion is formed on the surface on the internal wall side of said container.

11. The optical device according to claim 9,
    wherein said container is made of a metal, and
    at least a part of said container is anodized to be said anodized portion.

12. The optical device according to claim 9,
    wherein said container includes light-transmissible material portions arranged on both end portions thereof.

13. The optical device according to claim 12,
    wherein said insulative liquid material is arranged facing one of said light-transmissible material portions with a water-repellent material portion in between.

14. The optical device according to claim 13,
    wherein said conductive liquid material is arranged facing the other of said light-transmissible material portions with a hydrophilic material portion in between.

15. The optical device according to claim 12,
    wherein said second electrode is a ring-shaped electrode arranged on the end portion of said container in contact with said conductive liquid material.

16. The optical device according to claim 9,
    wherein said first electrode is formed by using metal selected from tantalum, aluminum, niobium, hafnium and titanium.

17. A method of manufacturing a variable focus lens, at least comprising the steps of:
    forming a first electrode to a container and anodizing at least the surface thereof to form an anodized portion, said anodized portion acting as a dielectric layer at an internal wall of the container;
    containing a conductive liquid material portion and an insulative liquid material portion in said container; and
    forming a second electrode that electrically conducts to said conductive liquid material portion.

18. The method of manufacturing a variable focus lens according to claim 17,
    wherein said container is made of an electrode material, and at least a part of said container is anodized to form said anodized portion.

19. The method of manufacturing a variable focus lens according to claim 17, wherein said first electrode is formed by using metal selected from tantalum, aluminum, niobium, hafnium and titanium.

20. The variable lens according to claim 1 wherein said container is cylindrical in shape.

21. The variable lens according to claim 1 wherein said container has a shape that includes a circle as a cross section perpendicular to an axis of the shape.

22. The variable lens according to claim 9 wherein said container is cylindrical in shape.

23. The variable lens according to claim 9 wherein said container has a shape that includes a circle as a cross section perpendicular to an axis of the shape.

* * * * *